(12) United States Patent
Pitkämäki et al.

(10) Patent No.: US 7,300,396 B2
(45) Date of Patent: Nov. 27, 2007

(54) DRIVING DEVICE FOR A CENTRIFUGAL SEPARATOR

(75) Inventors: Jouko Pitkämäki, Tumba (SE); Robert Sandblom, Älvsjö (SE)

(73) Assignee: Alfa Laval Corporate AB, Lund (SE)

( * ) Notice: Subject to any disclaimer, the term of this patent is extended or adjusted under 35 U.S.C. 154(b) by 0 days.

(21) Appl. No.: 10/551,161

(22) PCT Filed: Mar. 31, 2004

(86) PCT No.: PCT/SE2004/000492

§ 371 (c)(1),
(2), (4) Date: Jun. 5, 2006

(87) PCT Pub. No.: WO2004/089550

PCT Pub. Date: Oct. 21, 2004

(65) Prior Publication Data

US 2006/0276321 A1    Dec. 7, 2006

(30) Foreign Application Priority Data

Apr. 8, 2003    (SE) .................................. 0301029

(51) Int. Cl.
*B04B 9/04* (2006.01)
*B04B 9/14* (2006.01)

(52) U.S. Cl. ............... 494/15; 494/83; 494/84

(58) Field of Classification Search ............ 494/15, 494/46, 82–84; 384/108, 498, 438, 440; 464/179, 180
See application file for complete search history.

(56) References Cited

U.S. PATENT DOCUMENTS

| | | | | | |
|---|---|---|---|---|---|
| 2,487,343 A | * | 11/1949 | Kopf | .......................... | 384/535 |
| 2,534,738 A | * | 12/1950 | Scott | .......................... | 384/196 |
| 2,556,317 A | * | 6/1951 | Cook | .......................... | 384/535 |
| 2,698,131 A | * | 12/1954 | Cook | .......................... | 494/46 |
| 2,913,169 A | * | 11/1959 | Wilsmann | .................... | 494/15 |
| 2,916,201 A | * | 12/1959 | Heinrich et al. | .............. | 494/83 |
| 3,747,998 A | | 7/1973 | Klein et al. | | |
| 3,814,306 A | * | 6/1974 | Wutz et al. | .................... | 494/1 |
| 4,412,707 A | * | 11/1983 | Buffet | ........................ | 384/606 |
| 4,654,023 A | * | 3/1987 | Foldhazy | ..................... | 494/41 |
| 4,846,773 A | * | 7/1989 | Giebeler et al. | .............. | 474/82 |
| 4,946,433 A | * | 8/1990 | Gorodissky et al. | .......... | 494/15 |
| 5,800,070 A | * | 9/1998 | Nilsson et al. | .............. | 384/535 |
| 6,117,063 A | * | 9/2000 | Szepessy et al. | ............. | 494/14 |
| 6,224,533 B1 | * | 5/2001 | Bengtsson et al. | ............ | 494/82 |

(Continued)

FOREIGN PATENT DOCUMENTS

DE    3714627    11/1987

(Continued)

*Primary Examiner*—Charles E. Cooley
(74) *Attorney, Agent, or Firm*—Michaud-Duffy Group LLP

(57) ABSTRACT

In a centrifugal separator a centrifugal rotor is connected to a vertical spindle, which is supported by a frame and journalled in a first bearing and a second bearing. The centrifugal separator is drivable by an electric motor, the stator of the motor being fixed to the frame such that it is radially immovable relative to it, whereas the rotor of the motor is radially movable together with the spindle. The gap between the rotor and the stator of the motor is dimensioned so that it permits the radial movability of the rotor.

16 Claims, 2 Drawing Sheets

U.S. PATENT DOCUMENTS

| | | | |
|---|---|---|---|
| 6,228,016 B1 * | 5/2001 | Kristensen et al. | 494/14 |
| 6,267,204 B1 * | 7/2001 | Kristensen et al. | 184/6.16 |
| 6,354,988 B1 * | 3/2002 | Carson et al. | 494/82 |
| 6,428,460 B1 * | 8/2002 | Appelquist et al. | 494/82 |
| 6,626,814 B1 * | 9/2003 | Setterberg | 494/15 |
| 6,638,203 B2 * | 10/2003 | Carson et al. | 494/82 |
| 6,960,158 B2 * | 11/2005 | Mackel | 494/82 |
| 6,988,980 B2 * | 1/2006 | Moss | 494/15 |
| 7,090,634 B2 * | 8/2006 | Mackel et al. | 494/15 |
| 2004/0142808 A1 * | 7/2004 | Mackel | 494/82 |
| 2004/0192532 A1 * | 9/2004 | Mackel et al. | 494/15 |
| 2005/0065010 A1 * | 3/2005 | Moss | 494/15 |
| 2006/0276321 A1 * | 12/2006 | Pitkamaki et al. | 494/15 |

FOREIGN PATENT DOCUMENTS

| | | | |
|---|---|---|---|
| EP | 0054502 A1 * | 6/1982 | |
| EP | 0215585 A1 * | 3/1987 | |
| GB | 2037939 A | 7/1980 | |
| GB | 2277700 A * | 11/1994 | |
| SE | 507107 C2 | 3/1998 | |
| SE | 512770 C2 | 5/2000 | |

\* cited by examiner

DRIVING DEVICE FOR A CENTRIFUGAL SEPARATOR

FIELD OF THE INVENTION

The present invention relates to a driving device for a centrifugal separator, more closely a centrifugal separator comprising
- a centrifugal rotor, which is rotatable about a substantially vertical rotational axis,
- a spindle, which extends vertically and at its one end supports the centrifugal rotor,
- a frame, which rotatably supports the spindle during normal operation of the centrifugal rotor by means of a first bearing and a second bearing, said first bearing being arranged between the centrifugal rotor and said second bearing,
- a driving device having an electric motor, which is arranged to drive the spindle and which comprises a stator, which is non-rotatably connected to the frame, and a rotor, which is supported by the spindle between said two bearings,
- a spring device arranged to permit but counteract by spring force, in an area axially between the electric motor and the centrifugal rotor, radial movement of said first bearing relative to the frame, and
- a bearing support member supported by the frame and arranged to prevent substantial radial movement of said second bearing.

BACKGROUND OF THE INVENTION

A centrifugal separator of this kind is described in DE 37 14 627. The centrifugal rotor in this case is supported at the top of the vertical spindle, and the driving device comprises an electric standard type motor, which may be arranged in two different ways.

According to a main alternative the electric motor is situated below said second bearing, as shown in the drawing. Also another alternative is suggested, in which the electric standard type motor would be arranged between said two bearings. An arrangement according to the last-mentioned alternative would have the advantage that the whole centrifugal separator became more compact.

As can be seen from DE 37 14 327 said second (lower) bearing is radially immovable in relation to the frame, whereas said first (upper) bearing may move somewhat radially, so that the spindle may adapt itself to changes of position of the centre of gravity of the centrifugal rotor, which occur during operation of the centrifugal rotor. Such changes of position always occur to a larger or smaller extent and are caused by unbalance of the centrifugal rotor. Thus, the spindle will always perform oscillatory motions.

An arrangement of an electric standard type motor between the two layers, in accordance with the proposal in DE 37 14 627, for obtainment of a more compact centrifugal separator would, however, bring the disadvantage that the motor were forced to follow said oscillatory motions of the spindle. This would lead to an increased load on both the bearings and the frame, and particularly in connection with large and heavy centrifugal rotors having correspondingly large and heavy driving motors, this could become an unacceptable problem.

The object of the present invention is to provide a driving device for a centrifugal separator of the above defined kind, which driving device does not cause the bearings and the housing being subjected to unacceptably heavy loads but, despite this, makes possible a compact construction for the whole centrifugal separator.

SUMMARY OF THE INVENTION

According to the invention, the above-described object may be obtained by means of a driving device characterized in that the stator of the motor is fixed to the frame in a way such that it is radially immovable relative to the frame. On the other hand, the rotor of the motor is radially movable relative to the stator of the motor together with the spindle. A gap is defined between the rotor and the stator and is sized to permit radial movement of the motor rotor.

The invention may, if desired, be used in a centrifugal separator, wherein the spindle is suspended in a frame and the centrifugal rotor is supported at the lower end of the spindle. However, in a preferred embodiment of the invention the centrifugal rotor is supported at the upper end of the spindle.

The present invention prevents spindle oscillating, developed as a consequence of the centrifugal rotor being unbalanced from being transferred to the stator of the electric motor. Therefore, the bearings of the centrifugal separator are not subjected to unnecessary load as a consequence of such oscillations. This is despite the fact that the electric motor as a whole is arranged in the space between the two bearings.

A centrifugal separator of the above-described can kind can include a centrifugal rotor which may weigh up to 1000 kg, or more, and generally also includes a lubricating device arranged to provide lubrication to the two bearings. A preferred embodiment of the driving device according to the invention includes a lubricating device that has a generating member to generate an oil mist in an oil chamber. The first bearing and the second bearing are arranged in a first bearing chamber and a second bearing chamber, respectively. The bearing chambers communicate through oil passages with the oil chamber. The gap between the rotor and the stator of the motor forms a substantial part of a flow path for oil axially through the motor.

By this arrangement the oil used for lubrication of the bearings also may be used for continuous cooling of the electric motor upon, passage through gap between the rotor and the stator of the motor.

Preferably, a fan device is connected to the spindle and is arranged to, transport the oil mist in a circuit that include the gap in the motor. The fan device may be arranged between the first bearing chamber and an intermediate chamber communicating with the gap, the fan device being arranged to transport oil mist in one of the directions between the first bearing chamber and the intermediate chamber.

Preferably, the circuit comprises in addition to the gap in the motor at least one further passage connecting the bearing chambers with each other. The passage may be provided in an inexpensive and simple way by being created between the outside of the frame and a member connected to the frame. The passage preferably comprises several channels evenly distributed around the spindle and delimited between the frame and the member.

For removal of surplus heat, above all from the electric motor, the frame preferably is surrounded by a jacket delimiting a space for through flow of a cooling medium in heat transferring contact with the frame. In a preferred embodiment said jacket is double-walled, the inner one of the jacket walls delimiting together with the frame said channels for oil mist.

In a centrifugal separator of the kind here in question the spindle is often dimensioned so that it can be permitted to bend somewhat, even if insignificantly, during rotation of the centrifugal rotor. Such bending may cause a problem in an arrangement according to the invention, if the rotor of the electric motor is not as flexible as the spindle. The rotor of the motor may be composed of stacked ring-shaped discs permanently connected to each other to a very stiff cylindrical body. Even a slight displacement of these ring-shaped discs relative to each other during the manufacture of the cylindrical body may result in the openings at the ends of the body not being placed exactly coaxially. Upon mounting of the cylindrical body on the spindle this may lead to the spindle becoming loaded radially by the body and being brought to deflect from an exactly vertical line. To avoid problems of this kind it is suggested that the rotor of the motor at its one end is connected with the spindle in such a way that, in this area, it is radially immovable relative to the spindle but the remainder is free to move somewhat radially relative to the spindle, so that the relatively flexible spindle is not unnecessarily loaded by the relatively stiff rotor. Hereby it is also avoided that the rotor is damaged upon bending of the spindle during rotation of the centrifugal rotor. Furthermore, there is no need for very tight tolerances during the manufacture of the cylindrical body, which is to be the rotor of the electrical motor.

To facilitate connection of the rotor with the spindle in the way defined above the rotor may comprise a first part in the form of a substantially cylindrical sleeve and a second part surrounding the sleeve and connected thereto. The second part of the rotor may be constituted by a body comprising ring-shaped discs of the kind earlier described.

To minimize thermal influence on the spindle from the electric motor the rotor is suitably arranged so that a heat-insulating gap is formed between the rotor and the spindle at least along a part of the rotor of the motor. Such a gap is effective even if it is very thin, e.g. 1 mm.

A driving device according to the invention can be used in a centrifugal separator, wherein the centrifugal rotor is supported at the upper end of the spindle and the frame surrounds a space, in which the electric motor and a part of the spindle and also said two bearings are arranged. In such an arrangement the frame may be formed such, namely, that said space is completely closed from connection with the surrounding atmosphere below said first bearing. In this manner, it is possible to provide oil mist lubrication to the bearings without a risk of oil mist leaking out to the surrounding atmosphere.

BRIEF DESCRIPTION OF THE DRAWINGS

The invention is described in the following with reference to the accompanying drawing, in which.

DETAILED DESCRIPTION OF THE PREFERRED EMBODIMENTS

Figure 1:
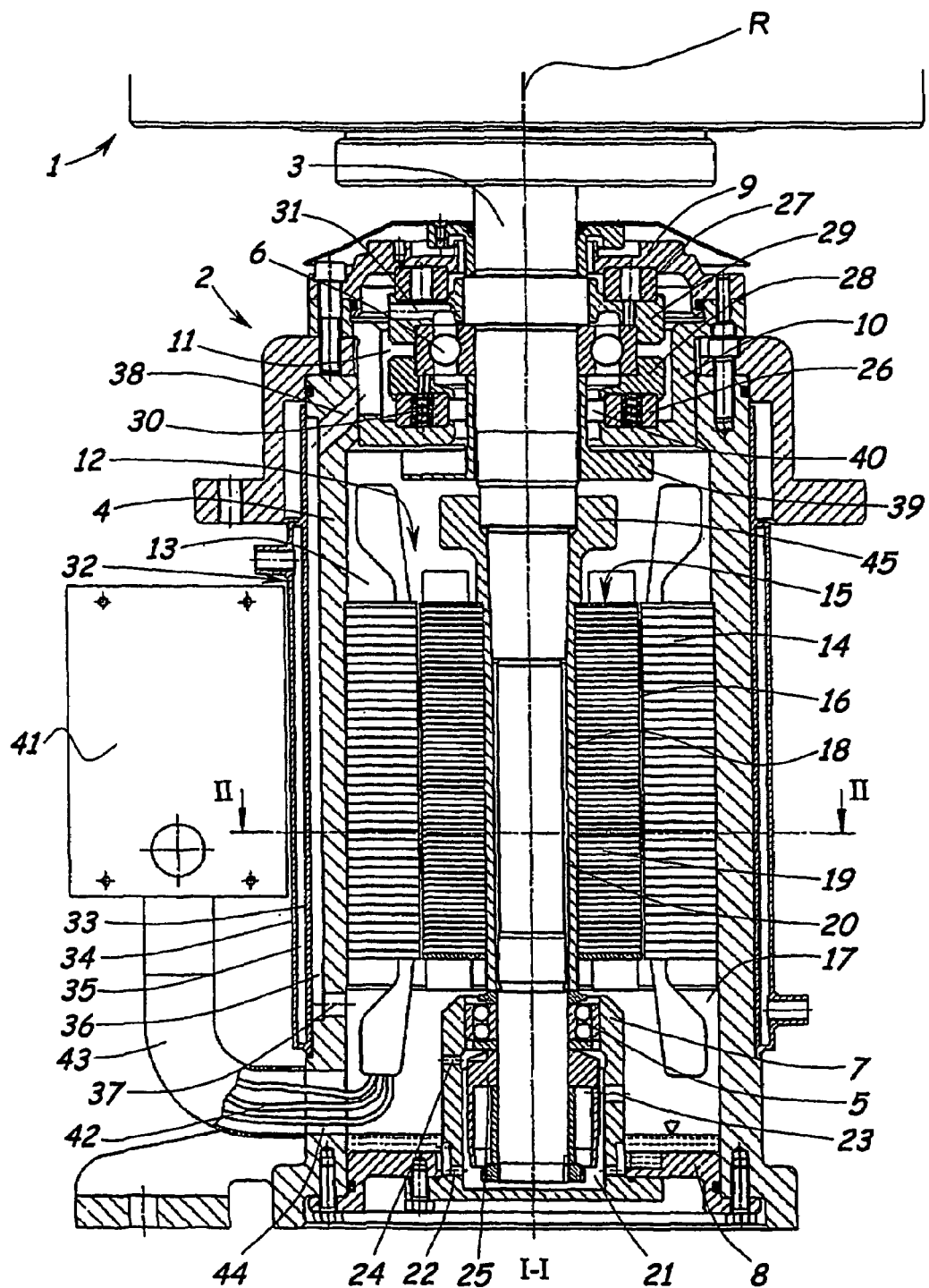
FIG. 1 shows an axial section of a driving device for the rotation of a centrifugal rotor.
Figure 2:
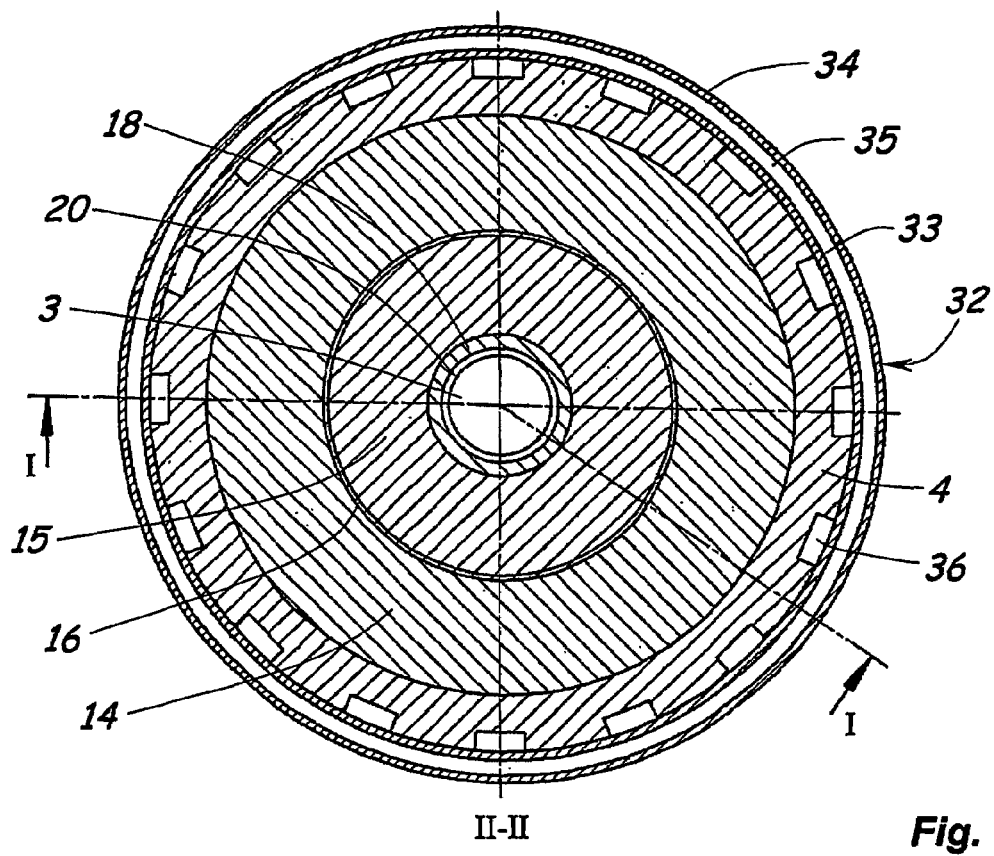
FIG. 2 shows a cross section through the driving device along the line II-II in FIG. 1.

FIG. 1 shows a part of a centrifugal rotor 1 and a driving device 2 for rotation of the centrifugal rotor around a vertical rotational axis R. The centrifugal rotor 1 is connected to the driving device 2 by means of a spindle 3.

The driving device 2 comprises a frame, the main part of which consists of a substantially cylindrical housing 4. This housing supports the spindle 3 via a lower bearing 5 and an upper bearing 6. The lower bearing 5 is supported by a bearing support member 7, which is connected with a bottom plate 8. The bottom plate 8 in turn is connected to the housing 4. The upper bearing 6 is supported by the upper part of the housing in a way that is described later.

The upper part of the housing is covered by a cap 9. Immediately below the upper bearing 6 a partition 10 is located, which between itself and the cap 9 delimits an upper chamber 11 in the upper part of the housing 4. The upper bearing 6 is situated within the upper chamber 11.

The upper bearing 6 is an angular contact ball bearing, which is dimensioned for transferring substantially all axial forces generated between the spindle 3 and the housing 4. The lower bearing 5, also a ball bearing, is dimensioned for transferring substantially only radial forces and is formed to permit some inclination of the spindle 3 in relation to a vertical line.

An electric motor 12 is arranged between the partition 10 and the bottom plate 8. An intermediate chamber 13 is delimited between the partition 10 and the motor 12. The motor 12 comprises a stator 14 and a rotor 15. The stator is rigidly connected to the housing 4, whereas the rotor 15 is connected to the spindle and thus rotatable together with the same. Between the stator 14 and the rotor 15, a gap 16 is formed, connecting the intermediate chamber 13 with a lower chamber 17 formed between the motor 12 and the bottom plate 8. The gap 16 permits a radial movement of the spindle 3 and the rotor 15 relative to the stator 14 and the housing 4.

The rotor 15 comprises two main parts, a sleeve 18 and a rotor package 19. The rotor package 19 consists of moulded ring-shaped metal discs which, stacked onto each other, surround and are rigidly connected to each other and to the sleeve 18. The sleeve 18, in turn, at its upper end, is connected to the spindle 3 in a way described in more detail below and more clearly shown in FIG. 3.

Along the sleeve 18 there is formed between this and the spindle 3 a gap 20 forming a heat-insulating layer, which minimizes thermal influence on the spindle 3 from the motor 12.

At its upper end the bearing support member 7 supports the lower bearing 5. Below the lower bearing 5 the bearing support member 7 delimits an oil chamber 21, which like the lower chamber 17 is partly filled with lubricating oil. The upper free surface of the oil is indicated by a small triangle. The oil chamber 21 communicates with the lower chamber 17 both below the oil surface of the oil through holes 22 and above the oil surface through holes 23 and 24. At its lower part, inside the bearing support member 7, the spindle 3 supports an oil mist generating member 25.

Within the upper chamber 11 the upper bearing 6 is supported by the housing 4 by means of a resilient suspension device comprising both lower and upper rubber bushings 26 and 27, respectively, and a lower and an upper ring-shaped member 28 and 29, respectively. The lower rubber bushings 26, distributed around the rotational axis R, are arranged between the lower ring-shaped member 28 and the partition 10. The upper rubber bushings 27, also distributed around the rotational axis R, are arranged between the upper ring-shaped member 29 and the cap 9. The ring-shaped members 28, 29 are arranged between the bearing 6 and respective bushings 26,27. Inside the lower bushings 26, screw springs 30 are arranged to make the entire suspension device somewhat stiffer. In the upper ring-shaped member 29 there are radial channels 31 connecting the upper chamber 11 with the interior of the bearing 6.

The purpose of the suspension device is to counteract by spring force, in an area axially between the electric motor 12 and the centrifugal rotor 1, a radial movement of the spindle 3 relative to the housing 4. The housing 4 is surrounded by a jacket 32. The jacket has an inner wall 33 and an outer wall 34. Between the walls 33,34 a space 35 is formed where a cooling fluid, e.g. water, may flow. The cooling fluid in this way may cool the housing 4, which is heated substantially by the electric motor during operation of the centrifugal rotor.

The outside of the surrounding wall of the housing 4 is provided with axial grooves evenly distributed around the rotational axis R. These grooves are covered radially outwardly by the inner wall 33 of the jacket and form channels 36. Each channel 36 communicates at its lower end with the lower chamber 17 through an opening 37, and communicates at its upper end with the upper chamber 11 through an opening 38.

In the intermediate chamber 13 the spindle 3 supports a fan device 39. This comprises a fan wheel with a number of wings or blades distributed around the spindle and extending outwards from it. The fan device has its suction side in communication with the upper chamber 11 through a central annular passage 40 and its pressure side in communication with the intermediate chamber 13. Alternatively, the fan device may be turned in a way having its suction side in communication with the intermediate chamber 13 and its pressure side in communication with the upper chamber 11.

The electric motor 12 is connected for its operation to a control unit 41. This in turn is connected to a source of current (not shown) and contains control equipment of some suitable kind for driving of, among other things, the motor 12. Cables 42 extend between the control unit 41 and the stator 14 of the motor through a pipe 43 and an opening 44 in the housing 4. For shielding off the interior of the control unit 41 from the interior of the housing 4, the pipe 43 at its connection to the control unit 41 is provided with a cover or the like, which fills or covers the interior of the pipe but through which the cables 42 extend.

Figure 3:
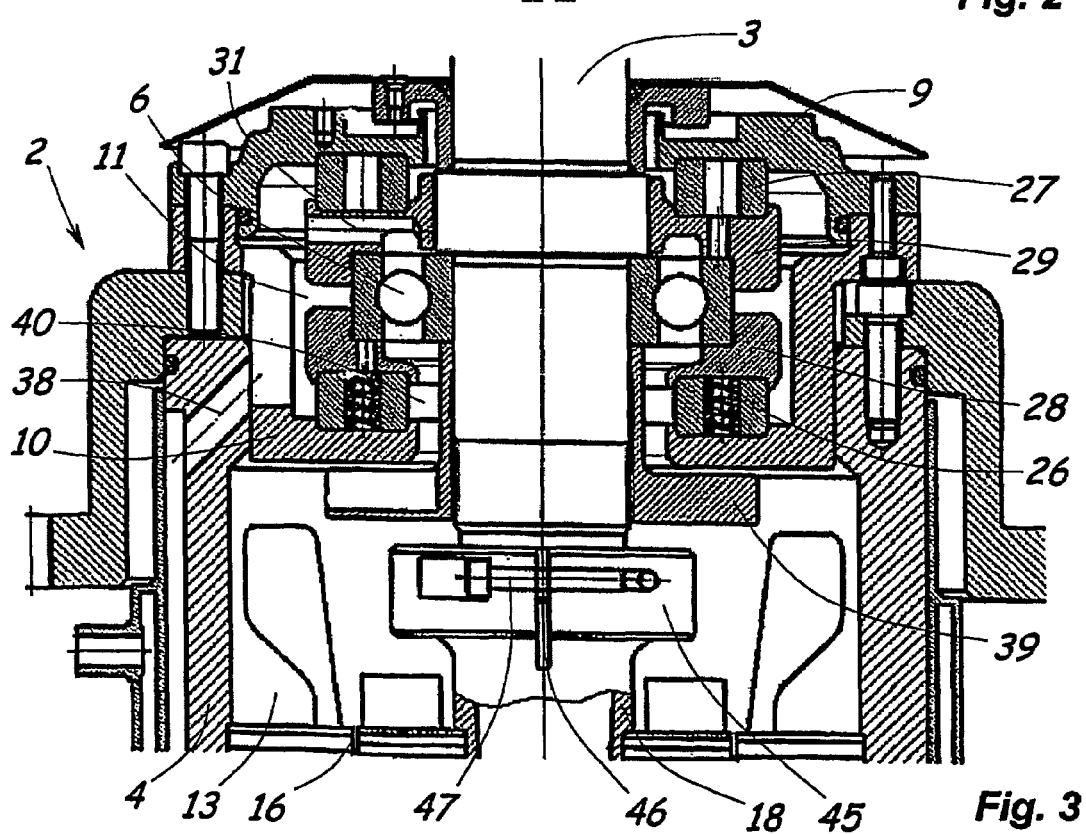
FIG. 3 shows a part of the driving device in a larger scale.

FIG. 3 shows a part of the driving device according to the invention in a larger scale. Moreover, FIG. 3 illustrates how the aforementioned sleeve 18 at its upper end is connected with the spindle 3.

Thus, as can be seen from FIG. 3, the sleeve 18 has an enlarged portion 45 at its upper end. This portion 45 has at least one axial slit 46 extending from the upper end of the sleeve 18 and a distance downwards. A screw 47, bridging the slit 46, is arranged to squeeze the portion 45 of the sleeve 18 firmly to the spindle 3. Preferably, there are two slits 46 and two screws 47 arranged diametrically on opposite sides of the spindle 3.

The above described driving device operates as follows upon rotation of the centrifugal rotor.

By means of the electric motor 12 the spindle 3, and thereby also the centrifugal rotor 1, is brought into rotation around the rotational axis R. The oil mist generating member 25 thereby is brought to rotate in the lubricating oil present in the oil chamber 21, so that a part of the lubricating oil is transformed into oil mist. The oil mist passes through the holes 23,24 and fills the lower chamber 17. This results in an effective lubrication of the lower bearing 5, the interior of which communicates with the upper part of the chamber 17.

By the rotation of the spindle also the fan device 39 is brought into rotation. This generates a certain overpressure in the intermediate chamber 13 and a certain underpressure in the upper chamber 11. Hereby, transportation of oil mist is accomplished from the lower chamber 17, through the openings 37, the channels 36 and the openings 38, to the upper chamber 11. Herefrom the oil mist is conducted through at least the channels 31 to the interior of the bearing 6 and further through the central passage 40 to the suction side of the fan device 39. This results in an effective lubrication of the upper bearing 6.

Air and possibly remaining oil mist is forced from the intermediate chamber 13 through the gap 16 of the motor back to the lower chamber 17. Also oil deposited on surfaces inside the housing 4 runs back to the oil bath in the lower chamber 17.

Upon rotation of the centrifugal rotor 1 unbalance may arise, e.g. as a result of separated solid particles being unevenly distributed in the separation chamber of the centrifugal rotor. Such unbalance may result in the spindle 3 being subjected to bending and/or the spindle 3 being caused to perform a rotational movement around and at a distance from a new rotational axis of the centrifugal rotor. Such movements of the spindle 3, or a part of the same, can occur due to the spring suspension of the upper bearing 6. Furthermore, in accordance with the invention, the gap 16 between the stator 14 and the rotor 15 of the electric motor is so wide, that this also permits such movements. For avoiding damage to the electric motor due to mechanical contact between the stator 14 and the rotor 15 upon too large movements of the spindle 3, it is suitable that limiting members (not shown) for such movements are included in the above described suspension device in the upper part of the housing 4.

The gap 20 between the spindle 3 and the rotor 15 is dimensioned in a way so that the spindle 3 may bended somewhat without contacting the rotor 15 below the connection between the spindle 3 and the sleeve 18.

According to the invention the gap 16 between the stator 14 and the rotor 15 of the motor has an important purpose to serve also by forming a transport path for the oil mist being transported in a circuit by means of the fan device 39. Thereby, in addition to lubricating and cooling the bearings 5 and 6 the oil mist also cool the motor 12, both its rotor and its stator. Thus, the oil mist continually removes heat from the motor during transport of the oil through the gap 16 and transfers this heat during its passage through the channels 36 to the cooling fluid flowing through the jacket 32. The cooling fluid simultaneously cools the outside of the stator of the motor being in contact with the inside of the housing 4. As earlier indicated, the fan device 39 alternatively may be arranged so that oil mist circulates in the reverse direction in the circuit described above, i.e. upwards through the gap 16 and downwards through the channels 36 on the outside of the frame.

The invention claimed is:

1. A driving device for a centrifugal separator, the centrifugal separator including:
    a centrifugal rotor rotatable about a substantially vertical rotational axis (R);
    a spindle that supports at one end thereof the centrifugal rotor;
    a frame, rotatably supporting the spindle during normal operation of the centrifugal rotor by means of a first bearing and a second bearing, said first bearing being arranged between the centrifugal rotor and said second bearing;
    said driving device comprising an electric motor arranged to drive the spindle and having a stator non-rotatably connected to the frame, and a rotor supported by the spindle between the two bearings;

a spring device arranged to permit but counteract by spring force, in an area axially between the centrifugal rotor and the electric motor, radial movement of the first bearing relative to the frame;

a bearing support member supported by the frame and arranged to prevent substantial radial movement of said second bearing; and wherein the stator of the motor is fixed to the frame and is immovable relative thereto, the rotor of the motor being radially movable relative to the stator together with the spindle, a gap between the rotor and the stator of the motor being dimensioned to permit the radial movement of the rotor of the motor.

2. A driving device according to claim 1, further comprising a lubricating device arranged for lubrication of said two bearings, the lubricating device having a generating member for generating an oil mist in an oil chamber, the first bearing and the second bearing being arranged in a first bearing chamber and a second bearing chamber, respectively, through which oil passages communicate with said oil chamber, and wherein the gap between the rotor and the stator of the motor forms at least part of a flow path for oil axially through the motor.

3. A driving device according to claim 2, wherein the lubricating device comprises a fan device arranged to transport oil mist in a circuit that includes the said gap.

4. A driving device according to claim 3, wherein the fan device is connected to the spindle for rotation therewith.

5. A driving device according to claim 4, wherein the fan device is arranged between the first bearing chamber and an intermediate chamber in communication with the gap, the fan device being arranged to transport oil mist in one of the directions between the first bearing chamber and the intermediate chamber.

6. A driving device according to claim 3, wherein the circuit includes the gap and at least one further passage connecting the said bearing chambers with each other.

7. A driving device according to claim 6, wherein the passage is delimited between and outside of the frame and a member connected to the frame.

8. A driving device according to claim 7, wherein the frame is surrounded by a jacket forming said member and delimiting a space for through flow of a cooling medium in heat transferring contact with the frame.

9. A driving device according to claim 8, wherein the jacket is double-walled, an inner one of the jacket walls delimiting the channels together with the frame.

10. A driving device according to claim 7, wherein the passage includes several channels evenly distributed around the spindle and delimited between the frame and the member.

11. A driving device according to claim 1, wherein the centrifugal rotor is supported at the upper end of the spindle.

12. A driving device according to claim 11, wherein the frame surrounds a space in which the electric motor and a part of the spindle and also the two bearings are arranged, the frame being formed such that said space is closed from connection with the surrounding atmosphere below said first bearing.

13. A driving device according to claim 1, wherein the first bearing is arranged to take up substantially all axial forces to be transferred between the spindle and the frame.

14. A driving device according to claim 1, wherein the rotor of the motor is coupled at one end of the spindle in such a way that it is radially immovable relative to the spindle in an area adjacent a location where the spindle is coupled to the motor rotor, the motor rotor being otherwise radially movable relative to the spindle.

15. A driving device according to claim 1, wherein rotor of the motor comprises a first part in the form of a substantially cylindrical sleeve connected to the spindle, and a second part surrounding the sleeve and connected to an outside surface thereof.

16. A driving device according to claim 1, wherein the rotor of the motor surrounds the spindle, a heat-insulating gap being formed between the rotor and the spindle at least along a part of the rotor of the motor.

* * * * *